US 10,987,704 B2

(12) United States Patent
Davies et al.

(10) Patent No.: US 10,987,704 B2
(45) Date of Patent: Apr. 27, 2021

(54) FAN OR PUMP ARRANGEMENT AND OPERATING METHOD

(71) Applicant: Fisher & Paykel Appliance Limited, Auckland (NZ)

(72) Inventors: Mervyn John Davies, Auckland (NZ); David James Hammond, Auckland (NZ); Zhuang Tian, Auckland (NZ)

(73) Assignee: FISHER & PAYKEL APPLIANCES LIMITED

( * ) Notice: Subject to any disclaimer, the term of this patent is extended or adjusted under 35 U.S.C. 154(b) by 336 days.

(21) Appl. No.: 15/574,792

(22) PCT Filed: May 20, 2016

(86) PCT No.: PCT/NZ2016/050085
§ 371 (c)(1),
(2) Date: Nov. 16, 2017

(87) PCT Pub. No.: WO2016/186525
PCT Pub. Date: Nov. 24, 2016

(65) Prior Publication Data
US 2018/0141092 A1    May 24, 2018

(30) Foreign Application Priority Data
May 20, 2015   (NZ) ........................................ 708315

(51) Int. Cl.
*B08B 7/02*       (2006.01)
*F04D 29/70*      (2006.01)
(Continued)

(52) U.S. Cl.
CPC .............. *B08B 7/02* (2013.01); *F04D 29/703* (2013.01); *F04D 17/00* (2013.01); *F04D 19/005* (2013.01);
(Continued)

(58) Field of Classification Search
CPC .......... B08B 7/02; F04D 29/70; F04D 29/703
See application file for complete search history.

(56) References Cited

U.S. PATENT DOCUMENTS 5,963,991 A * 10/1999 Agosti .................... E03D 9/002
4/233
2007/0057805 A1* 3/2007 Gomez ................ F04D 25/088
340/691.2
(Continued)

FOREIGN PATENT DOCUMENTS

CN         103362840 A      10/2013
CN         204082695 U      1/2015
(Continued)

OTHER PUBLICATIONS

International Search Report and Written Opinion for PCT/NZ2016/050085.
(Continued)

*Primary Examiner* — Joseph L. Perrin
*Assistant Examiner* — Kevin G Lee
(74) *Attorney, Agent, or Firm* — Clark Hill PLC; James R. Foley

(57) ABSTRACT

An electric fan with a self-cleaning mode to energise rotating fan blades in alternate forward and reverse directions to create a vibration in order to shake built-up dust or dirt particles from the blades in a frequency at which the rotational direction is alternated set to a known or detected resonant frequency of the blades thereby excite resonant modes and maximise the amplitude of vibrations. The self-cleaning operation may be triggered by detection of excessive/abnormal loading on the motor. The fan may be operated in a vibration detecting mode over a range of rotational speeds to locate speeds that produce resonance, or to detect a fault with the fan. Motor reversal frequencies corresponding to resonance-inducing speeds may be used in the self- (Continued)

cleaning mode. The vibration detecting mode may be carried out while the at least one blade is rotated in a direction opposite to its normal operational rotational direction.

9 Claims, 2 Drawing Sheets

(51) Int. Cl.
    *H02K 29/06*     (2006.01)
    *H02P 6/30*     (2016.01)
    *H02P 25/032*     (2016.01)
    *F04D 19/00*     (2006.01)
    *F04D 17/00*     (2006.01)

(52) U.S. Cl.
    CPC ............... *H02K 29/06* (2013.01); *H02P 6/30* (2016.02); *H02P 25/032* (2016.02)

(56) References Cited

U.S. PATENT DOCUMENTS

| | | | |
|---|---|---|---|
| 2011/0238328 A1* | 9/2011 | Dhanekula | ............... G01H 3/08 |
| | | | 702/39 |
| 2013/0263894 A1 | 10/2013 | Huang et al. | |
| 2017/0074080 A1* | 3/2017 | Peterson | ............... E21B 43/126 |

FOREIGN PATENT DOCUMENTS

| | | | |
|---|---|---|---|
| CN | 104564850 | 4/2015 | |
| EP | 2960521 A1 * | 12/2015 | ............ F04D 27/00 |
| WO | 2014/166714 | 10/2014 | |

OTHER PUBLICATIONS

Preliminary Report on Patentabilityfor PCT/NZ2016/050085.
Dickerson, Andrew K., et al., "Wet mammals shake at tuned frequencies to dry", Journal of the Royal Society Interface, published online Aug. 17, 2012.

* cited by examiner

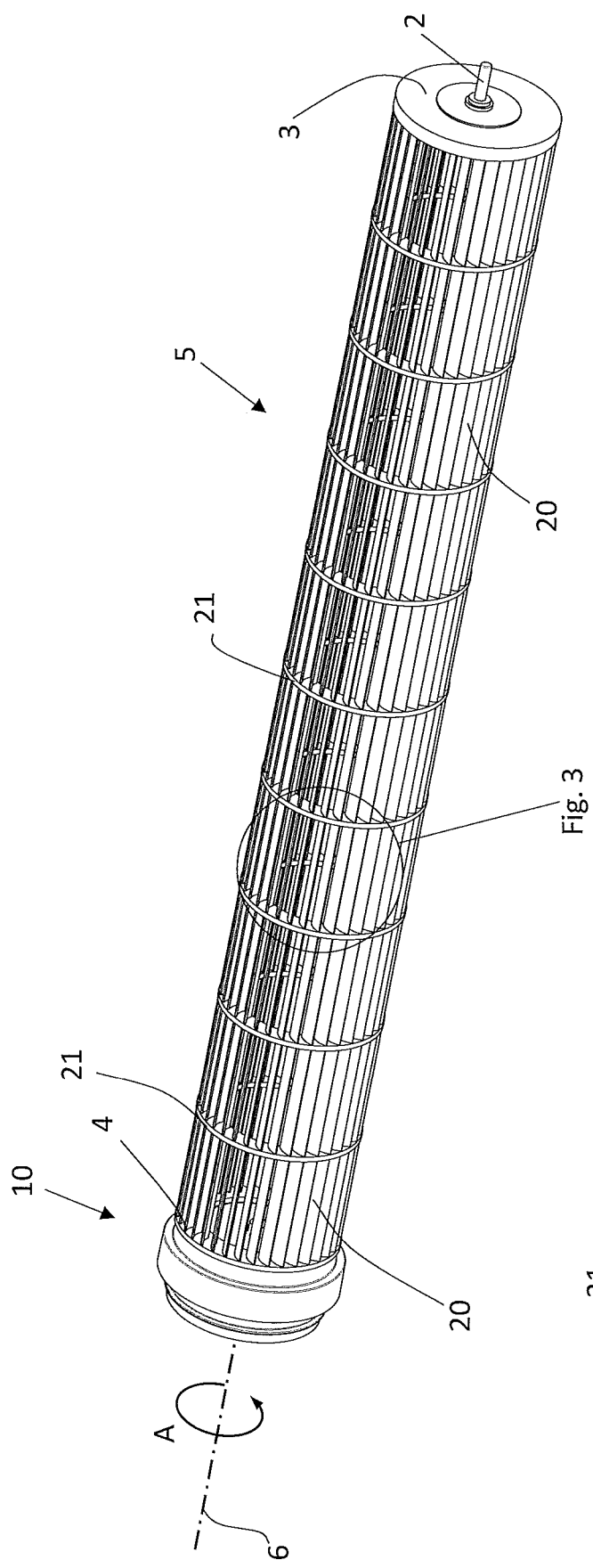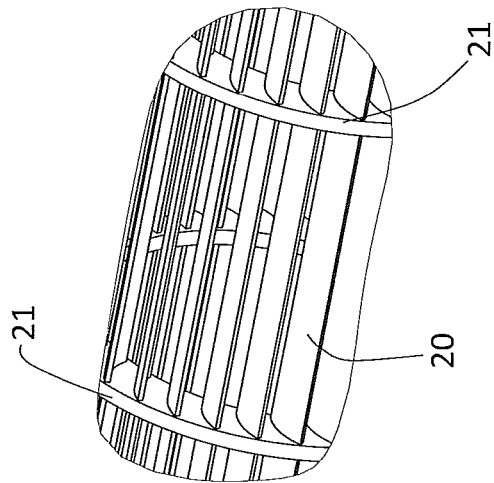

FAN OR PUMP ARRANGEMENT AND OPERATING METHOD

RELATED/PRIORITY APPLICATION

This application is a National Phase filing regarding International Application No. PCT/NZ2016/050085, filed on May 20, 2016, which relies upon NZ Application No. 708315, filed on May 20, 2015 for priority.

TECHNICAL FIELD

The present invention relates to fluid moving devices such as electric fans or pumps and more particularly, though not solely, to methods of operating electric fans or pumps for cleaning purposes and to electric fans or pumps incorporating a controller for carrying out such methods.

BACKGROUND ART

Electric fans and pumps are used in a wide range of modern machinery to provide a beneficial flow of fluid, often air. The fluid flow in such machinery incorporating electric fans may, for example, be used to remove heat from a part of the machinery, such as electronics, to maintain the machinery at an acceptable temperature. In other applications, for example in refrigerators, air-conditioning or heat-pump units, the fluid flow may be used to transfer heat between a heat source and a destination so as to provide heating or cooling at the destination. It is well known that the vanes or blades of electric fans, particularly those used to move air, accumulate dust or other air-entrained particles on their blades after a period of operation. Such accumulation of matter on the fan blades results in unwanted or even excessive mechanical loading on the fan motor, reduces generated air flow velocity and/or volume, can be a health or cleanliness issue, and can also generate unwanted audible noise. For example, the blades of electric fans in air-conditioning units or in heat-pumps, often despite the presence of an air filter in the air flow path through the device, will eventually accumulate a layer of dust or dirt thereon after a relatively lengthy period of operation.

Manual cleaning of the fan may need to be carried out on a regular basis by a trained technician, usually requiring at least partial dismantling of the unit incorporating the fan, and often involving the application of compressed air or high-pressure water to remove contaminants. Other previous attempts to remove the accumulated contaminants from fan blades have included occasionally operating the fan in a rotational direction opposite to the fan's normal operating direction. This technique can remove some loosely-clinging dust from the blades but usually has little or no effect on the majority of the dust or dirt adhering to the fan blades. Furthermore, at least in relation to tangential-flow (also known as "cross-flow") impellers, the physical arrangement of the individual blades produces little or no air flow across the blades such that reversing the direction of rotation of the fan does not aid in removing dirt or dust from the blades.

A further known fan cleaning technique is disclosed in US20130263894A wherein, depending upon the value of a control signal indicative of motor current, voltage or power, the fan may be controlled so that it rotates alternately in forward and reverse directions over specified rotation angles within a "predetermined" (but undefined) period of time. Small rotation angles are selected to remove smaller dust particles from the blades while larger rotation angles are selected to remove larger dust particles from the blades. The rotation angle, in either direction, ranges between 5° and 270°.

SUMMARY OF INVENTION

It is therefore an object of the present invention to provide an electric fan or pump and/or a method of operating an electric fan or pump which will go at least some way towards overcoming the above disadvantages, or which will at least provide the public with a useful choice.

In a first aspect, the invention may broadly be said to consist in an electric fan or pump comprising:
  an electric motor including a rotor selectively drivable in both forward and reverse rotational directions,
  at least one rotatable blade in driving relationship with the rotor and arranged to develop a flow of fluid in response to rotation in at least the forward rotational direction, and
  a motor controller operable in a self-cleaning mode to energise the rotor for rotation of the at least one blade in alternate forward and reverse directions to thereby create a vibration.

Preferably the vibration is in the at least one blade or in a component connected to the fan or pump.

In a second aspect, the invention may broadly be said to consist in a method of operating an electric motor of an electric fan or pump in a self-cleaning mode, the motor including a rotor selectively drivable in both forward and reverse rotational directions, the rotor being in driving relationship with at least one rotatable blade which is arranged to develop a flow of fluid in response to rotation in at least the forward rotational direction, the method comprising:
  energising the rotor for rotation of the at least one blade in alternate forward and reverse directions to thereby create a vibration.

In a third aspect, the invention may broadly be said to consist in a fan or pump assembly comprising:
  an electric motor including a rotor selectively drivable in both forward and reverse rotational directions,
  at least one rotatable blade in driving relationship with the rotor and arranged to develop a flow of fluid in response to rotation in at least the forward rotational direction,
  a chassis in which the at least one blade is rotatably mounted,
  a motion detecting device capable of detecting vibrational motion in the fan or pump assembly or its immediate vicinity and providing an output signal indicative of the magnitude of such vibrational motion, and
  a motor controller operable in a vibration determining mode to energise the rotor to rotate the at least one blade at at least one rotational speed and to determine from the output signal of the motion detecting device whether, as a result of said rotor energisation, vibrational motion is being generated in the immediate vicinity of the fan or pump assembly or in at least one component of the fan or pump assembly.

In a fourth aspect, the invention may broadly be said to consist in a method of operating an electric motor of an electric fan or pump assembly in a vibration determining mode, the motor including a rotor selectively drivable in both forward and reverse rotational directions, the rotor being in driving relationship with at least one rotatable blade rotatably mounted in a chassis, the at least one blade being arranged to develop a flow of fluid in response to rotation in at least the forward rotational direction and the fan or pump assembly further including a motion detecting device capable of detecting vibrational motion in the fan or pump assembly or its immediate vicinity and providing an output signal indicative of the magnitude of such vibrational motion, the method comprising:

energising the rotor to rotate the at least one blade at at least one rotational speed, and determining from the output signal of the motion detecting device whether, as a result of said rotor energisation, vibrational motion is being generated in the immediate vicinity of the fan or pump assembly or in at least one component of the fan or pump assembly.

The invention consists in the foregoing and also envisages constructions of which the following gives examples only. In particular, the invention is mainly described with reference to its implementation in an air-conditioning or heat-pump unit, however one skilled in the art will appreciate that the electric fan and its method of operation described below are suitable for use in a variety of applications such as refrigerator or freezer fans, computer cooling fans, room extractor fans, personal cooling fans, oven/cooker electronics cooling fans, ceiling fans, laundry clothes drier fans and the like. As previously mentioned, the invention is also applicable to pumps that ordinarily move liquid rather than air, for example a pump of a dishwasher or laundry washing machine. Furthermore, the electric fan/pump and method of operation disclosed below are applicable not only to tangential (or cross)-flow type fans but also to other fan types such as radial-flow fans and centrifugal fans.

BRIEF DESCRIPTION OF DRAWINGS

Preferred forms of the invention will now be described with reference to the accompanying drawings, in which:

FIG. 2 is a perspective view of the impeller of the fan of FIG. 1, and FIG. 3 is an enlarged partial view of a region of the fan impeller of FIG. 2.

DESCRIPTION OF EMBODIMENTS

Figure 1:
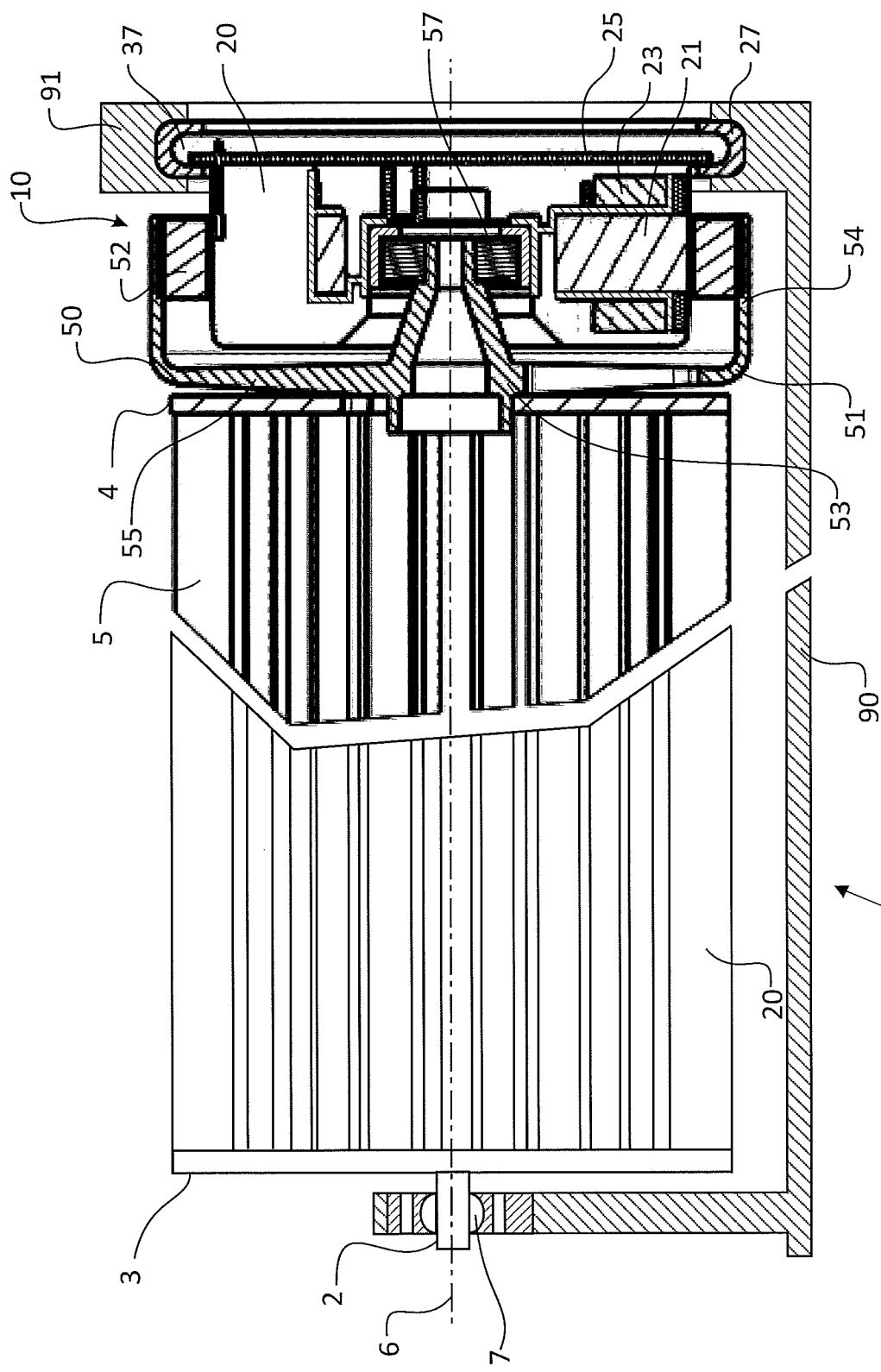
FIG. 1 is a cross-sectional view of an air-conditioning unit fan assembly in accordance with an embodiment of the present invention.

FIG. 1 illustrates an exemplary application of the electric fan or pump and fan or pump control system of the present invention for removing contaminants such as dust or dirt (or lint, in the case of a laundry clothes drier fan) from the blades of the fan/pump. In FIG. 1 a fan, including a fan impeller 5 and motor 10, is shown incorporated within an air-conditioning or heat-pump fan assembly 1 wherein the fan is of the tangential-flow type. As mentioned above, the invention is equally applicable to other types of fans or pumps with different rotating, fluid-moving blade arrangements (including fan wheel, impeller or propeller arrangements) installed in any of numerous machines such as various home appliances. The exemplary air-conditioning unit fan assembly 1, or impeller and motor arrangement, shown in FIG. 1 has previously been described in our prior International patent publication WO2014098625A, the disclosure of which is hereby incorporated by reference although a summary thereof is provided below.

Motor 10 is a brushless, or permanent magnet, rotor electronically commutated motor (ECM) and includes, in this purely exemplary form, an internal stator 20 and an external rotor 50. As will be apparent from the following description, the motor, irrespective of its type, should be capable of rapid rotation reversal but the particular type of motor and the particular configuration and arrangement of rotor and stator are not essential aspects of the invention. One of ordinary skill in the art will appreciate that the apparatus and method described below are equally applicable to, for example, an internal rotor/external stator motor, an axial-flux motor, a claw pole motor, or a switched reluctance motor.

The stator 20 has a magnetically permeable core 21 with an annular ring portion and a plurality of poles extending radially outwardly from the outside of the annular ring portion. Conductive windings 23 are wound about the poles. The rotor 50 may include a rotor frame 51 with permanent magnet poles 52 that are formed in a ring that is slightly larger than the circle formed by the ends of the stator poles so that the magnet poles can face the ends of the stator poles when the rotor is assembled about the stator with a small air-gap therebetween. The illustrated rotor frame 51 comprises a hub 53 at a rotational axis 6 of the motor 10 and of the fan impeller 5. The hub 53 supports the rotor poles 52 for rotation about the axis. Hub 53 is rotationally mounted to the stator via bearing element 57. In the illustrated exemplary fan assembly, the rotor frame 51 also comprises a circumferential side wall 54 for positioning the magnet poles 52 outside the stator 20, and at least one member 55 (for example, a disc or end wall) extending between the hub 53 and the circumferential side wall 54. The circumferential wall 54 may be generally cylindrical.

A printed circuit board or PCB 25, including motor control circuitry and electronic components for electrical commutation of the stator windings 23, is included with the stator assembly 20. The PCB 25 may therefore include a motor controller which may be implemented in a microcontroller with associated memory for storing software code for carrying out motor speed/direction/torque etc. control as well as the present fan self-cleaning routine. The motor control circuitry may also comprise sensors for use by the motor controller. In some configurations, the sensors can include hall-effect sensors for sensing rotor position and for feeding the sensed rotor position back to the motor controller. Based upon the sensed rotor position, the motor controller is then able to appropriately commutate the motor to achieve a desired rotor (and therefore permanent magnet) rotational position/speed by energising an appropriate stator winding or windings.

As can be seen most clearly in FIG. 2, the exemplary tangential-flow fan impeller 5 has a substantially cylindrical form, consisting of a plurality (for example 30) of individual blade elements 20 circumferentially arranged around the periphery of a circle co-axial with its rotational axis 6, and extending longitudinally between axially separated impeller end plates 3, 4. The interior of the impeller 5 may be substantially empty. Blades 20 may be substantially flat or slightly curved to form a slight "cup" shape opening towards the direction of rotation of the impeller so as to capture and move fluid more effectively. Purely to provide some perspective, the fan impeller could for example be about 70 cm long and have an outer diameter at the outer edges of the blades 20 of around 9 cm.

Fan impeller 5 is preferably injection-moulded from a plastics material such as Styrene-acrylonitrile (SAN). As best seen in FIG. 3, support rings 21 which are co-axial with rotational axis 6 may be provided at regular intervals along the axial length of the impeller to thereby add rigidity to the impeller structure, which may be required to be rotated at speeds of up to 1200 rpm during normal operation. The provision of support rings 21 effectively divides the blades 20 into plural, series-connected shorter blade elements. End plate 3 is provided with a short impeller shaft 2 protruding therefrom. As can be seen in FIGS. 1 and 2, rotor 50 may conveniently be mounted directly to end plate 4 of the impeller. After manufacture of the rotor or after construction of the fan assembly, the fan impeller 5 may be tested at an appropriately-high speed to simulate its expected operational range and balancing weights applied at appropriate locations in the known way. Rather than injection moulding the impeller, it may formed using alternative techniques dependent upon the material used. Such alternative materials may include other polymeric materials, lightweight metal or metal-alloy substances or polymer reinforced carbon-fibre. It will be appreciated that instead of the impeller being formed as a unitary structure it may be manufactured from separate components connected, glued, welded or otherwise fixed together wherein the individual components may be made from any of the above or any other suitable material.

As shown in FIG. 1, the fan assembly is formed by mounting the fan impeller 5 and motor 10 to a chassis 90. The fan, fan assembly and/or impeller could alternatively be mounted within or include a housing (not shown). In the illustrated embodiment an annular rim 37 of the stator is located within a clamp 91 at one end of the chassis and impeller shaft 2 is supported within another bearing element 7 at the axially opposite end of chassis 90. The thus unitised fan assembly 1 may be easily mounted within an appropriately-sized space in an air-conditioning or heat-pump unit in which, during operation, the fan impeller is rotated in an operating direction A (FIG. 2). Rotation of the impeller in the operating direction generates an air flow through the unit, which in the case of an air-conditioning unit, is caused to pass through a cooled evaporator (not shown) so that the unit may produce and direct a cooled air flow.

As mentioned above, during prolonged operation of the fan, dust/dirt and other such contaminant particles will naturally accumulate on the surfaces (particularly the leading surfaces) of blades 20. The electric fan and control method according to an embodiment of the present invention incorporates a self-cleaning mode which uses a vibrating effect to shake dust or dirt particles from the surfaces of the fan blade or blades. The vibration of the rotor and impeller is particularly a rotational vibration about the impeller structure's rotational axis and/or a radial vibration across the impeller structure. The vibrating effect is achieved by alternating or reciprocating the direction of rotor energisation or the direction of rotation of the fan impeller at a relatively high reversal frequency (of for example, between about 1 kHz and about 5 kHz or 10 kHz). That is, in the self-cleaning mode, the motor controller initially energises a stator winding or windings, with knowledge of the actual rotor position relative to the stator poles, so as to cause the rotor and fan impeller to commence/continue movement in a first rotational direction and then, a fraction of a second later, the motor controller energises a stator winding or windings with further knowledge of the actual rotor position so as to cause the rotor and fan impeller to be commutated in the opposite rotational direction.

This reversal of commutation direction will of course slow the impeller's rotation in the first direction and eventually stop rotation and start impeller rotation in the opposite direction. The reversal of the commutation direction may be regularly repeated at the above-mentioned reversal frequency. During the period of time that the rotor and impeller are rotating in any particular direction, depending upon the required rotation direction reversal rate, the motor controller may change the commutation pattern applied to one or more stator windings, each of which patterns generate rotor torque in the same direction, so as to create/maintain rotation in that rotational direction prior to reversal of the commutation direction. Of course, if the reversal rate/frequency is such that each commutation period is no longer than the required rotation period in a particular direction, then only a single commutation pattern may be applied to the winding(s) during each reversal.

In an alternative embodiment, vibration may be established in the impeller without the need for conventional motor commutation, and therefore without the need for rotor position feedback. In this alternative embodiment, a cyclical voltage signal such as a sinusoidal signal from a signal generator may be applied to one or more stator winding, possibly via an amplifier. During the self-cleaning mode, the impeller reciprocates or alternates between the first and the opposite rotational directions while rotating only a fraction of 1° (that is, less than 1°) in either direction. For example, the impeller may rotate less than about 0.5° in the first direction and then rotate less than about 0.5° in the opposite direction.

Various reversal frequencies may be employed to improve dirt/dust/contaminant removal from the blades. It should also be noted that it is not essential that the vibrational motion be balanced. That is, the rotational period in one direction may be longer than the period in the opposite direction. Furthermore, the rotation period in a particular direction may be altered in subsequent rotations. For example, a subsequent rotation in a particular direction may be longer or shorter than the previous rotation in that direction. In another example, rotation periods in a first direction may gradually reduce while rotation periods in the opposite direction gradually increase. This pattern may be reversed in accordance with a predetermined pattern, such as cyclically so that rotations in the first direction are then gradually increased while the rotation periods in the opposite direction gradually reduce.

In another alternative embodiment, the rotation periods in one or both directions in the self-cleaning mode may be restricted within a predetermined time period range but the duration of each rotation period may be substantially or completely random or pseudorandom within the predetermined range. Various combinations of the above techniques may be carried out during any particular occurrence of the self-cleaning mode and different techniques may be utilised during different self-cleaning mode occurrences, and/or specific techniques may be instigated for a particular fan assembly installation based upon the history of use or environmental parameters (such as one or more of average ambient temperature, work/rest ratio, default mode, etc.) of the particular unit.

In a modified embodiment, the frequency at which the rotational direction of the fan impeller is reversed is selected to correspond substantially with a known natural resonant frequency of the impeller and/or the fan rotational assembly. It will be appreciated that reversal of direction of the rotor/impeller at or near a resonant frequency of the impeller/fan assembly will maximise the amplitude of resultant vibratory movements of the impeller/assembly's structure to thereby improve soil removal. Still further, the motor's reversal frequency may be chosen to substantially correspond with one or more of plural natural resonant frequencies of the fan impeller/assembly, which are known to excite specific resonant modes.

The reversal frequency could also be selected to correspond to a known or detected frequency that causes vibrational and/or resonant motion in a component of an appliance in which the fan or pump is installed or attached to. That is, vibrational/resonant motion may be produced in a component of an appliance or unit which is mechanically interconnected to the fan/pump or to a rotating component thereof by transmission of such vibration through the interconnected structure. For example, in an air-conditioning unit the flow of air often passes through various fluid manipulating components such as an air filter and vanes for directing air-flow that are not a part of the fan itself. Dust or other contaminants may accumulate in any of these components and those components may be made to vibrate/resonate due to the vibrations emanating from the rotor or other rotating component of the fan/pump. It may therefore be beneficial to reverse the energisation or rotational direction of the rotor in the self-cleaning mode at a frequency that generates vibration or resonance of one or more fluid manipulating component or, in general, of a component of the appliance on or in which dust or contaminants is/are likely to accumulate to thereby shake or dislodge those contaminants therefrom.

For example, a first resonant mode may be excited at a first reversal frequency whereby a torsional mode is established in the impeller in which the end distant from the motor oscillates around axis 6, relative to the motor end 4 of the impeller. This tortional mode may result in twisting of the individual blades which may clean a selection of dust/dirt particle sizes from the blades and/or another mode may be excited at a second reversal frequency which causes the individual blades 20 to vibrate by bending along their axial lengths and/or to flex radially. This second, bending, mode may be more effective at removing some dirt or dust and may, for example, occur at or around 1800 Hz. The motor may be operated to select only one of the plural modes by operating during the self-cleaning mode at or near one of the resonant frequencies or the motor controller may energise the motor sequentially in different modes at different times, each of which causes the impeller to rapidly alternate its rotational direction to induce a rotational vibration in the impeller at or near different resonant frequencies at different times. In a still further embodiment, the above-described techniques for varying the period of rotation in one or both directions may be practiced at/about a resonant frequency to further increase the dirt/dust removal "power" of the vibratory/oscillatory rotations.

The value or values of the resonant frequency or frequencies of the impeller or of the fan assembly may be average or representative values determined experimentally or theoretically and stored within a memory device of the motor control circuitry. Such average or representative values may be indicative of a typical impeller/assembly. Alternatively, the resonant frequency or frequencies may be determined during manufacture of each impeller/assembly and stored in a memory device of the motor control circuitry associated with the respective impeller/assembly. Alternatively, a resonant frequency value(s) for a particular impeller/assembly may be determined once the unit/appliance has been installed in its operational location, as part of an installation operating routine of software controlling operation of the unit/appliance by operating the motor at a variety of speeds, receiving feedback from a sensor providing a signal indicative of resultant physical translational movement of the impeller/assembly, and identifying the rotational speed or speeds at which peaks in the amplitude of the movement occur. In particular, this will identify resonant frequencies of the assembly and any housing or casing in which the assembly is mounted, rather than of the impeller itself which may be at a much higher rotational speed than the motor will normally operate at.

However, any identified resonant frequency may be representative of a higher order harmonic frequency that will excite a particular resonant mode in the impeller and so may be used during the self-cleaning mode. Each identified rotational speed in revolutions per minute may be divided by 60 to obtain an equivalent rotational frequency in hertz corresponding to the abovementioned reversal frequency. A further adjustment to account for the cyclical mechanical excitation caused by the "cogging" of the stator poles may involve multiplying the resulting frequency in Hz by the number of poles to obtain an effective frequency at which the structure is mechanically excited during rotation, and using that effective frequency in a subsequent self-cleaning operation.

Such an installation operating routine may, for example, operate the motor in a single direction from an initial speed (for example, 0 rpm) to a maximum speed (for example, 1200 rpm) uniformly over a predetermined period of time (for example, 2 minutes). For increased accuracy, the speed may ordinarily be incremented at a first step size (say, 10 rpm) until the beginning of a resonance peak is detected or until just before a resonance peak is expected at which time the speed is incremented at a second, smaller, step size (say, 2 rpm) until the peak has passed and the step size reverts to the first step size again. While this sweeping of rotational speed may be carried out in the normal operating rotational direction of the impeller, particularly in the case of tangential-flow fans, the sweeping of rotational speeds may be carried out in the rotational direction opposite to the normal operating direction. As a result, the mapping of resonant frequencies for the particular impeller/assembly may be achieved while generating little audible noise and no or minimal air flow so that user inconvenience is minimised. Furthermore, during normal operation of the unit, the motor controller may avoid rotating the motor/impeller at rotational speeds corresponding to any of the determined resonant frequencies, or at least minimise the period of time during which rotation occurs at any of those speeds/frequencies (by, for example, accelerating through that speed or those speeds).

Alternatively, rather than storing a determined or predetermined resonant frequency or frequencies, the self-cleaning mode may consist of or include a period of time during which the reversal frequency is swept from low to high or high to low. For example, the reversal frequency may be gradually increased or decreased between about 1 kHz and about 5 kHz or 10 kHz using a step size of, for example, 100 Hz incremented/decremented every 1 to 3 seconds. In this way, one or more resonant frequency of the impeller's mechanical structure may be excited. Once at or near a particular resonant frequency, the reversal frequency may be held constant for a longer period of time, for example between 5 seconds and 30 seconds, before recommencing the aforementioned gradual increase/decrease. The reversal frequency may be adjusted up or down during the scan, particularly about potential or known resonance frequencies, to hunt for those resonance frequencies.

Optionally, irrespective of how the resonance modes are arrived at, immediately following the excitation of the aforementioned torsional resonant mode, an unpowered or "free-wheeling" period of the rotor may occur. The unpowered period may last for between about 1 and about 20 seconds during which time the vibrational intensity of the torsional mode will diminish although the impeller flexing produced during the unpowered period will potentially still have the strength to beneficially remove dirt or dust from the blades.

At the completion of the vibratory rotation part of the self-cleaning mode it may be beneficial to then carry out a period of rotation in the rotational direction opposite to the normal operating direction of the impeller. As mentioned above, particularly in the case of tangential-flow fans, reverse rotation is relatively quiet and does not generate any appreciable air flow and so is not particularly noticeable to a user of the unit. This period of reverse rotation may last for between say 30 seconds and 5 minutes at a rotational speed of up to about 1200 rpm and may ensure that any dirt or dust particles sitting at or near the leading edge of the blade, as a result of the self-cleaning routine, are removed.

One or more of the self-cleaning vibratory or oscillatory rotation reversal techniques may continue for a predetermined period of time or the vibratory self-cleaning process may be ended upon attainment of a desirable value of a feedback signal from the motor control circuitry. The feedback signal may indicate, for example, that the fan impeller and rotor are now more responsive to changes in commutation signal due to the removal of a sufficient amount of dirt or dust therefrom. For example, by measuring the time taken for the rotor to accelerate to a predetermined rotational velocity.

Initiation of the self-cleaning mode of operation of the electric fan in accordance with an embodiment of the invention may be based solely on expiration of a predetermined period of time, either since initial operation of the fan or the appliance in which it is installed, or from the previous self-cleaning mode occurrence. Alternatively, the self-cleaning mode may be initiated upon request by a user via a user interface such as a remote control unit or built-in control panel.

In a further alternative embodiment, initiation of the self-cleaning mode as herein described may occur in response to the detection of an excessive (that is, above a predetermined threshold) or out of the ordinary loading on the rotor due to the accumulation of contaminant air-entrained particles on the blades. For example, detection of an increase in the current in a motor phase, which is substantially proportional to mechanical motor load, may indicate to a control device that the blades require cleaning. Other conditions that may be detected in order to commence the self-cleaning mode may include the detection of out of balance and the detection of resonant behaviour during normal operation of the fan. After a self-cleaning operation has been performed, a further check of conditions indicating the need for a further self-cleaning routine may be made and an additional self-cleaning mode routine initiated if required. Such conditions may be detected (either so as to trigger an initial or a subsequent self-cleaning mode routine) by the motor control circuitry and/or by additional sensors providing control signals thereto, such as one or a combination of a gyroscopic sensor, an accelerometer or a microphone. For example, in the case of sound level input from a microphone, rotational speeds that cause excessive rattling of internal or external components of the electric fan or fan assembly or of the appliance (including screws, clips etc.) in which the fan is installed, or even of nearby objects attached to or influenced by vibrations generated by the fan, may be detected and preferably recorded. The rotational speed(s) causing the detected noise(s) may then be avoided (or their duration minimised) during normal operation of the fan.

In some cases the detected value representing loading, balance or resonant behaviour may exceed a predetermined threshold value indicating, for example, that the impeller or a component of the fan assembly may have failed, broken or worn out and thus require replacement. In such cases the user interface of the unit or appliance may be activated to indicate such status to a user and optionally, for safety purposes, the motor control circuitry may not allow the motor to be rotated.

Initiation of the self-cleaning mode may also or alternatively be controlled dependent upon particular environmental factors of each fan installation. For example, a sensor may be provided within the appliance or fan assembly to enable the motor controller to commence the self-cleaning mode only after first ensuring that no one is in the same room, or in the immediate vicinity of the appliance, or has been for a predetermined period of time. This may be achieved, for example, by a passive infrared sensor, a light sensor or a microwave motion sensor and such a check will minimise inconvenience to a user who may notice a change in audible noise emanating from the appliance. Initiation of the self-cleaning mode may also, or alternately, be controlled so as to only occur during certain periods of the day known to minimise user disturbance, such as in the early hours of the morning or late at night.

The invention claimed is:

1. An electric fan or pump comprising:
   an electric motor including a rotor selectively drivable in both forward and reverse rotational directions,
   at least one rotatable blade in driving relationship with the rotor and arranged to develop a flow of fluid in response to rotation in at least the forward rotational direction, and
   a motor controller configured to operate in a self-cleaning mode to energise the rotor for rotation of the at least one blade in alternate forward and reverse directions to thereby create a vibration,
   wherein the motor controller is configured to alternate the rotational direction of the at least one blade, at least during a part of the duration of the self-cleaning mode, at a reversal frequency that is at or near a resonant frequency of the at least one blade or of a rotating assembly of the motor, the rotating assembly including the at least one blade and the rotor.

2. The electric fan or pump as claimed in claim 1, wherein the motor is configured to alternate the rotor's rotational direction such that the at least one blade rotates less than 1°, preferably less than 0.5°, in either rotational direction, or such that the period of rotation in each direction is less than 0.1 second.

3. The electric fan or pump as claimed in claim 1, further comprising a sensor device for detecting vibrational motion of at least one of the motor and the at least one blade during rotation wherein the motor controller is configured to initiate the self-cleaning mode based at least in part upon the sensor detecting that the at least one of the rotor and the at least one blade is not rotationally balanced, that the motor is excessively loaded or that the at least one of the rotor and the at least one blade is resonating.

4. The electric fan or pump as claimed in claim 1, further comprising a user's-presence detection device for detecting the presence of a user in a detection zone of the electric fan or pump, wherein the motor controller is configured to initiate the self-cleaning mode based at least in part upon failure of the user's-presence detection device to detect the presence of a user in the detection zone.

5. The electric fan or pump as claimed in claim 1, wherein the at least one blade is part of a tangential-flow impeller, the blades extending longitudinally, co-axial with a rotational axis of the impeller, and wherein the reversal frequency is a resonant frequency of the impeller which excites a bending motion of the blades or a twisting motion of the blades.

6. The electric fan or pump as claimed in claim 1, wherein the motor controller is configured to:

during at least part of the self-cleaning mode, sweep the reversal frequency of the at least one blade over a range of frequencies from an initial frequency to an end frequency, the range including at least one resonant frequency of the at least one blade or of the rotating assembly, or subsequent to a period of reversal at or near a resonant frequency of the at least one blade or of the rotating assembly, de-energise the motor for a period of time so that the free-wheels, or during at least part of the duration of the self-cleaning mode, rotate the at least one blade for a period of time in the reverse rotational direction.

7. The electric fan or pump as claimed in claim 1, further comprising a memory device for storing at least one value corresponding to at least one resonant frequency for use by the motor controller in the self-cleaning mode, wherein the motor controller is configured to energise the rotor in a resonance detection mode to rotate the at least one blade at a range of rotational speeds and, when a particular rotational speed of the at least one blade causes resonance in the at least one blade or in the rotating assembly, a value indicative of that particular rotational speed is stored in the memory device.

8. The electric fan or pump as claimed in claim 7, wherein the motor controller is configured to operate in the resonance detection mode to rotate the at least one blade only in the reverse rotational direction.

9. The electric fan or pump as claimed in claim 7, further comprising a resonance detector, or a microphone, or an accelerometer or a gyroscopic sensor.

* * * * *